Patented Sept. 13, 1949

2,481,509

UNITED STATES PATENT OFFICE 2,481,509

DIRECTIONAL SYSTEM

Paul G. Hansel, Red Bank, N. J.

Application September 5, 1945, Serial No. 614,587

7 Claims. (Cl. 343—118)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to a new and advantageous method of and means for determining the direction of arrival of wave energy, and particularly to radio direction finding on waves of extremely high frequency.

One object of this invention is to provide a direct-reading radio direction finder capable of operation on extremely high frequencies.

Another object is to provide a method of direction finding which does not result in amplitude modulation or mutilation of the received signal.

Still another object is to provide a direction finding method which enables continuous and unambiguous determination of direction without the use of a sense antenna or the equivalent thereof.

Although in this disclosure the invention is described as applied to radio direction finders, it will be apparent that methods and apparatus similar to those described can be applied readily to direction finding on other types of wave energy, particularly on acoustic waves.

For a better understanding of the invention, together with other and further objects thereof, reference is had to the following description taken in connection with the accompanying drawing, wherein like parts are indicated by like reference numerals and wherein:

Figure 1 is a schematic circuit diagram of the invention; and

Figure 4 is a schematic diagram of a modified antenna system that may be used with the circuit in Fig. 1.

Figure 2:
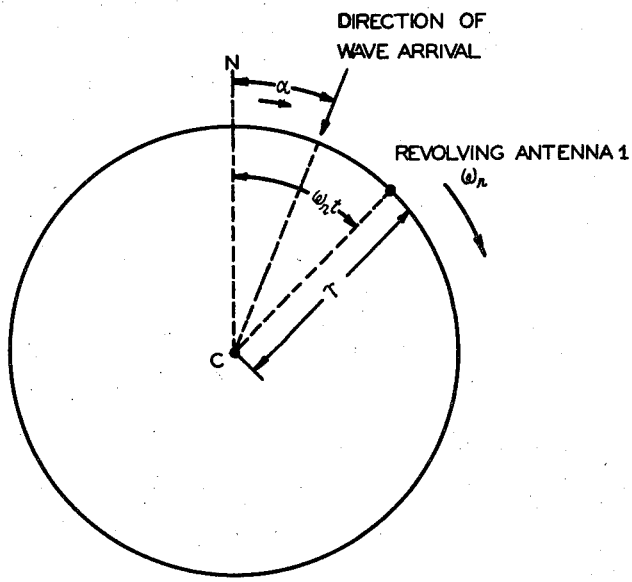
Figures 2 and 3 are diagrams illustrating the operation of the invention.
Figure 3:
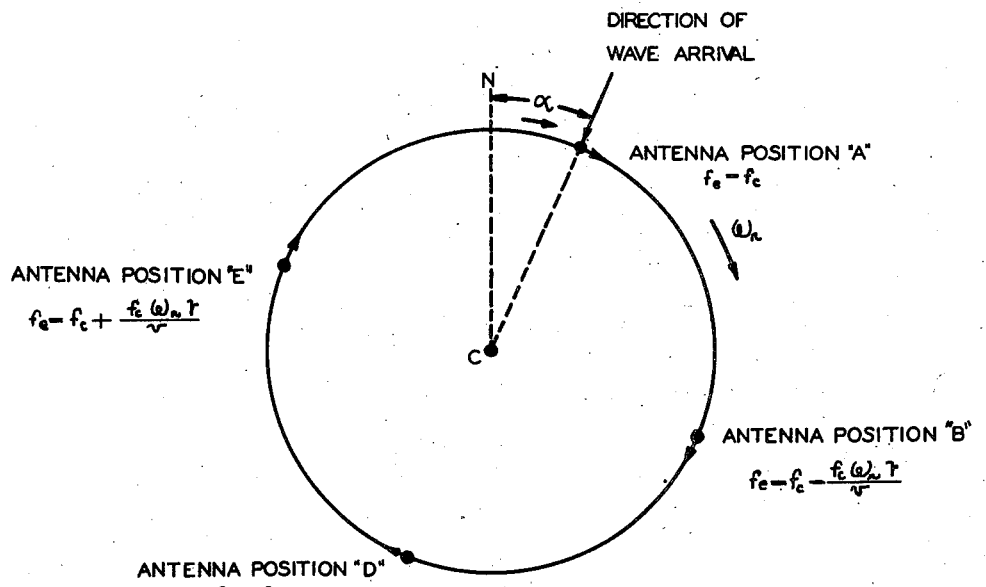

Reference is now made to Fig. 1 which illustrates one form of direction finder arranged in accordance with the invention. A non-directional vertical antenna 11 is mounted on one end of a horizontal arm 12 which is supported on a vertical shaft 13. A motor 14 drives the shaft, thereby causing the antenna to revolve in a circular path. The signal induced in antenna 11 is conveyed through slip rings 16 to a superheterodyne receiver 17, comprising an R.-F. amplifier 18, a local oscillator 19, a mixer 20, an I.-F. amplifier 21, a conventional amplitude modulation (AM) detector 22, an audio amplifier 23 and a loud-speaker 24, the last three units constituting a monitoring channel.

Part of the intermediate-frequency signal from the I.-F. amplifier 21 is passed through a limiter 25 to remove any amplitude modulation which may be present and is then applied to a frequency or phase deviation expander 26. The output of the expander is applied to a frequency modulation (FM) detector 27 which may include a conventional frequency discriminator circuit.

Because of the rotation of the antenna, its effective position with respect to the wave in space is continuously varied and hence its output is phase modulated due to the Doppler effect. Hence the output of the FM detector is a low-frequency signal 28 having a frequency determined by the rate at which the antenna is revolved and a phase which is determined by the direction of arrival of the received signal. A bearing indication is obtained by applying the low-frequency signal 28 obtained from the FM detector to a phase meter 30. A reference signal 29 of fixed phase and having the same frequency as the low-frequency signal 28, is also supplied to the phase meter, said reference signal being derived from an alternator 15 driven by the motor 14. The display 31 of the phase meter presents direction without ambiguity.

As previously stated, this invention is based upon the Doppler effect. The manner in which the Doppler effect is utilized to determine the direction of wave arrival will be apparent from the following analysis:

Figure 2 represents a top view of the revolving antenna shown in Fig. 1. The antenna 11 is assumed to revolve in a clockwise direction about a center point C with a uniform angular velocity $\omega_r$. The direction of wave arrival $\alpha$ is measured clockwise from north. The radius of the circular path traveled by the antenna is designated by $r$.

The radio frequency field $E_c$ at the center of revolution C will be taken as a reference and is represented by the equation:

$$E_c = E_m \sin \omega_c t \qquad (1)$$

where $E_m$ is the maximum value of field strength and $\omega_c = 2\pi f_c$, $f_c$ being the free-space frequency of the signal.

The phase $\phi$ of the field acting on the revolving antenna is a function of the antenna position and may be represented by the equation:

$$\phi = \frac{2\pi r}{\lambda} \cos(\omega_r t - \alpha) \qquad (2)$$

or $$\phi = \frac{2\omega_c r}{v} \cos(\omega_r t - \alpha) \qquad (3)$$

where $v$ = the free-space velocity of propagation
$\lambda$ = the free-space wavelength The signal voltage $e_a$ induced in the revolving antenna may therefore be represented by the equation:

$$e_a = E_m h_e \sin\left[\omega_c t + \frac{\omega_c r}{v} \cos(\omega_r t - \alpha)\right] \qquad (4)$$

where $h_e$ is the effective height of the antenna.

be made therein without departing from the invention.

I claim:

1. A receiver system for translating carrier waves modulated in accordance with a signal from a particular transmitting station and for determining the direction of arrival of said waves comprising: means for receiving said waves at a point which is periodically and harmonically moving relative to said station at a relatively low rate to superimpose upon the received waves a periodic wave-length deviation having a period equal to that of the motion of said point and a phase which is related to said direction, a pair of parallel channels energized by said received waves, one of said channels including a detector to derive the signal modulation component of said waves, the other channel including an expander for increasing the maximum wave-length deviation of said received waves, a wave-length modulation detector coupled to the output of said expander for deriving a current having a phase angle related to said direction of arrival, and means for comparing the phase angle of said current with that of a current representing a reference direction.

2. A receiver system for translating amplitude-modulated carrier waves from a particular transmitting station and for determining the direction and sense of arrival of said waves comprising: means for receiving said waves at a point which is periodically and harmonically moving relative to said station at a relatively low rate to superimpose upon the received waves a periodic wave-length deviation related to said direction and sense of arrival, a pair of parallel channels energized by said received waves, one of said channels including an amplitude-modulation detector, the other channel including in cascade an amplitude limiter, an expander for increasing the maximum wave-length deviation of said waves, a wave-length modulation detector coupled to the output of said expander for deriving a current having a phase related to said direction and sense of arrival, and means for comparing the phase of said current with that of a current representing a reference direction.

3. A receiver system for translating amplitude-modulated carrier waves and for determining the direction of arrival of said waves comprising: an antenna for receiving said waves, a motor for moving said antenna along a circular course at a relatively low rate to superimpose upon the received waves a periodic frequency deviation which is related to said direction of arrival, a pair of parallel channels energized by said received waves, one of said channels including an amplitude-modulation detector, the other channel including in cascade an amplitude limiter, an expander for increasing the maximum frequency deviation of said waves, a frequency-modulation detector coupled to the output of said expander for deriving a current having a frequency equal to said rate and a phase angle related to said direction of arrival, means driven by said motor to generate a current representing a reference direction, and means for comparing the phase relation of said currents.

4. The method of translating radiated waves modulated in accordance with a signal which comprises: receiving said waves at a point moving toward and away from the source of said waves at a given cyclic rate so as to superimpose on the received waves a wave-length modulation related to the direction of arrival of said waves, demodulating a first portion of the received waves to derive the signal modulation component therefrom, increasing the maximum wave-length deviation of a second portion of said waves, deriving from the waves of increased deviation a current having a frequency equal to said rate and a phase angle corresponding to said direction, obtaining a reference compass current having the same frequency and a phase angle related to a reference compass point direction, and ascertaining the phase relation of said currents.

5. The method of translating amplitude modulated waves which comprises: receiving said waves at a point moving toward and away from said point at a given cyclic rate so as to superimpose on the received waves a wave-length modulation related to the direction of arrival of said waves, demodulating a first portion of the received waves to derive the amplitude modulation component therefrom, amplitude limiting and increasing the maximum wave-length deviation of a second portion of said waves, deriving from the waves of increased deviation a current having a frequency equal to said rate and phase angle corresponding to said direction, obtaining a reference compass current having the same frequency and a phase angle related to a reference compass point direction, and ascertaining the phase relation of said currents.

6. The method of translating amplitude-modulated carrier waves which comprises: receiving said waves at a point moving along a circular path at a uniform rate so as to superimpose on the received waves a frequency modulation related to the direction of arrival of said waves, demodulating a first portion of the received waves to derive the amplitude modulation component therefrom, amplitude limiting and increasing the maximum frequency deviation of a second portion of said waves, deriving from the waves of increased deviation a current having a frequency equal to said rate and a phase angle corresponding to said direction, obtaining a reference compass current having the same frequency and a phase angle related to a reference compass point direction, and ascertaining the phase relation of said currents.

7. A receiver system for translating carrier waves modulated in accordance with a signal and for determining the direction of arrival of said waves, comprising: a vertical antenna for continuously receiving energy from a given transmitting station, said antenna having a non-directional, horizontal plane characteristic and being positioned at one end of a horizontal arm, said arm being attached to a vertical shaft, means for causing said shaft to rotate at a constant speed to superimpose a sinusoidal deviation of the wave-length of said energy, receiving means including a pair of parallel channels connected to said antenna; one of said channels including a detector to derive the signal modulation component of and waves; the other channel including means to multiply said deviation, means connected to the output of said last-named means for obtaining from the wavelength modulated energy a current having a frequency dependent upon said speed and a phase angle dependent upon the direction and sense of said received wave, means actuated in synchronism with the rotation of said shaft for generating a reference current having a frequency equal to said frequency and a phase related to a reference compass point direction, and means for indicating the phase relation of said currents, whereby the direction and sense of said incoming wave may be ascertained.

PAUL G. HANSEL.

REFERENCES CITED

The following references are of record in the file of this patent:

UNITED STATES PATENTS

| Number | Name | Date |
|---|---|---|
| 2,133,615 | Gerjard | Oct. 18, 1938 |
| 2,212,110 | Beuermann | Aug. 20, 1940 |
| 2,225,456 | Koschmieder | Dec. 17, 1940 |
| 2,233,275 | Wolff | Feb. 25, 1941 |
| 2,284,475 | Plebanski | May 26, 1942 |
| 2,403,727 | Loughren | July 9, 1946 |
| 2,405,203 | Goldstein | Aug. 6, 1946 |
| 2,405,281 | Bemis | Aug. 6, 1946 |
| 2,408,039 | Busignies | Sept. 24, 1946 |
| 2,408,040 | Busignies | Sept. 24, 1946 |
| 2,411,518 | Busignies | Nov. 26, 1946 |
| 2,414,798 | Budenbom | June 28, 1947 |

FOREIGN PATENTS

| Number | Country | Date |
|---|---|---|
| 553,090 | Germany | June 24, 1932 |

Certificate of Correction

Patent No. 2,481,509 — September 13, 1949

PAUL G. HANSEL

It is hereby certified that error appears in the printed specification of the above numbered patent requiring correction as follows:

Column 6, line 63, for the word "and" before "waves" read *said*;

and that the said Letters Patent should be read with this correction therein that the same may conform to the record of the case in the Patent Office.

Signed and sealed this 31st day of January, A. D. 1950.

[SEAL]

THOMAS F. MURPHY,
*Assistant Commissioner of Patents.*